May 20, 1941.　　　L. E. SODERQUIST　　　2,242,795
TIRE VULCANIZER
Filed June 23, 1939　　　3 Sheets-Sheet 1

INVENTOR
LESLIE E. SODERQUIST

BY

ATTORNEYS

May 20, 1941.                L. E. SODERQUIST                2,242,795
                                TIRE VULCANIZER
                              Filed June 23, 1939            3 Sheets-Sheet 2

INVENTOR
LESLIE E. SODERQUIST

BY

ATTORNEYS

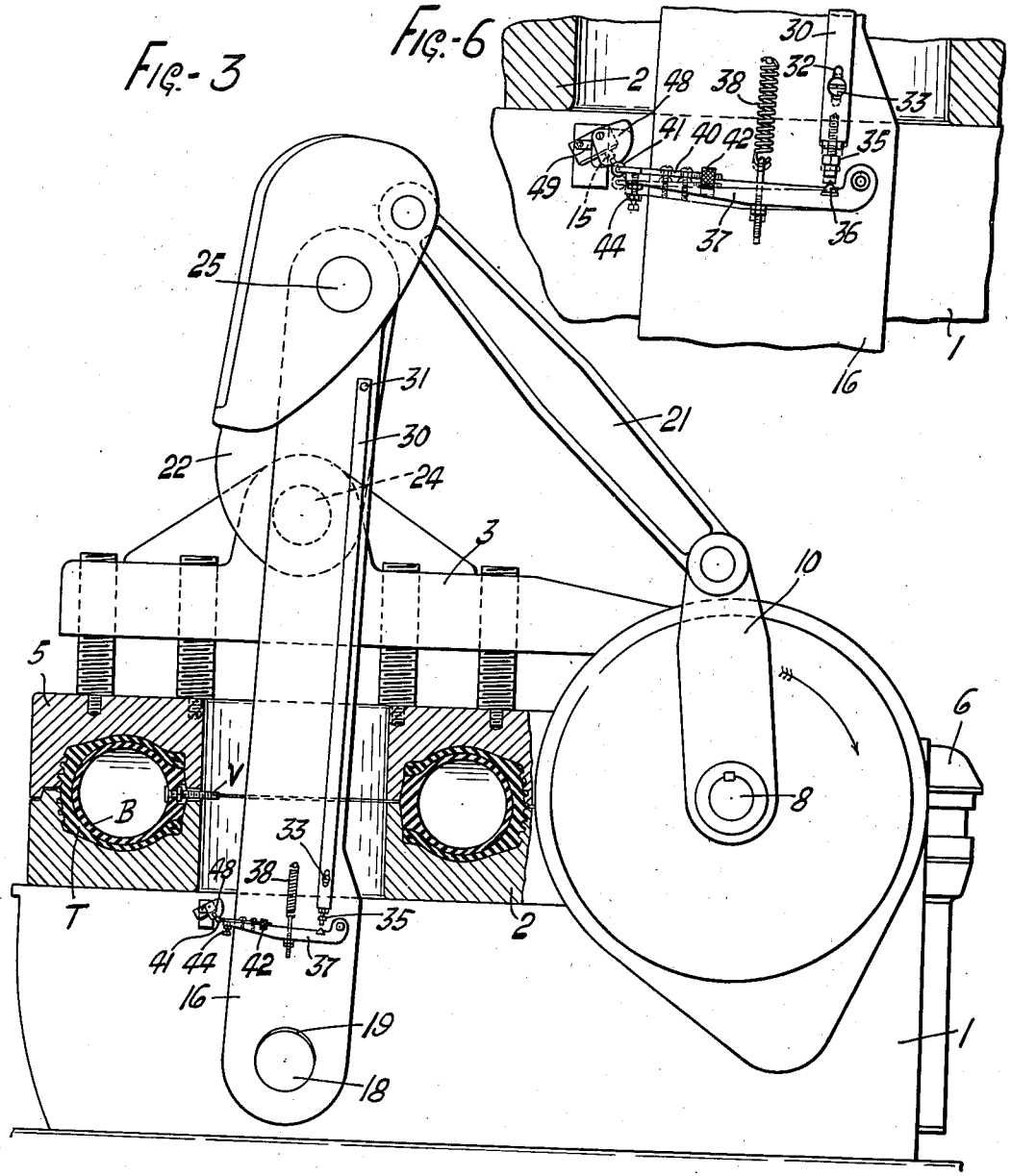

Patented May 20, 1941

2,242,795

UNITED STATES PATENT OFFICE 2,242,795

TIRE VULCANIZER

Leslie E. Soderquist, Akron, Ohio, assignor to The McNeil Machine & Engineering Company, Akron, Ohio, a corporation of Ohio Application June 23, 1939, Serial No. 280,749

16 Claims. (Cl. 18—17)

This invention relates to vulcanizing presses and more particularly to a tire vulcanizing press having a safety mechanism thereon which will insure that the press will not open sufficiently to endanger the workmen while pressure above a predetermined amount remains in the curing bag which is used during the vulcanization of tires in the press.

It is well known that in the curing of pneumatic tires it is extremely dangerous to separate the mold sections sufficiently to permit blowing out of the bag while any substantial amount of pressure remains in the curing bag. This is particularly true in connection with the individual or twin type curing press now in substantial use by tire manufacturers, since most of these presses are automatic in operation. With these automatic presses, it is only necessary to place an uncured tire having an air bag or curing bag therein into the press and start the operation of the press mechanism. In normal operation, the press then closes, steam or hot water under pressure enters the curing bag for a predetermined length of time to effect vulcanization of the tire. After vulcanization, the steam or hot water is released from the curing bag and the press opens. All of the operations of this type of press are automatic except the placing and removal of the tire.

If the press always operates in the normal manner, there would be no need for a safety device thereon. However, experience has shown that on some occasions, due to the valve not functioning properly in the pressure line which leads to the curing bag, or because of impediments in the discharge line, or for some other reason, the pressure fluid cannot immediately escape from the curing bag and unless the press is arrested while a harmful amount of pressure remains in the curing bag, the equipment may be substantially damaged and the workmen seriously injured. There have been several attempts made to provide "so-called" safety devices for this type of press, but so far as I am aware, none of these devices has been entirely satisfactory because they did not depend for their operation entirely on the presence of pressure in the curing bag and, furthermore, did not always function properly when they were needed.

It is an object of this invention to provide a press of the character referred to having safety mechanism which depends for its operation entirely on the presence of a predetermined amount of pressure in the curing bag and which is positive in its operation to arrest opening of the press when such pressure is present in the bag.

Previous attempts to prevent the opening of the press while fluid under pressure is in the air bag have been only partially effective for none has been truly responsive to the pressure within the bag. The primary cause of entrapment of fluid pressure within the bag is the clogging of the bag outlet directly at the valve stem, due to the flaking off of bits of rubber from the interior of the bag which lodge in the narrow passage of the valve stem. Earlier attempts to provide a safety device have consisted in the location of a pressure-responsive control element in the conduit leading from the valve stem to the outlet for the fluid pressure. While these devices may be operative in the event of restriction of the flow occurring in the conduit, they are wholly ineffective if the impediment in the line is between the fluid responsive element and the bag. As explained above, the primary source of trouble is immediately at the bag outlet, and no device has heretofore successfully prevented the opening of the press in the presence of fluid pressure in the bag from whatever cause.

The present device is directly controlled by the pressure within the air bag and while it does not, in the presence of pressure within the bag, act to inhibit the opening movement of the press, it will arrest the press actuating means before the molds have parted sufficiently to permit the bursting of the air bag. The operation of the mechanism is such that in the presence of pressure in the bag, the press will start to open and continue its opening movement until the actuating means is brought to a stop, which point is normally set so that the molds will not be separated sufficiently to permit rupture of the bag.

The point of control can be set in any desired position so that the safety of the operation is insured.

In a broader sense, the present invention has as its object the provision of means truly responsive to the pressure within the bag which prevents the opening of the press when the degree of pressure is such as to endanger the safety of the workmen by bursting of the bag.

It will be further understood that the device is so constructed that only those pressures which are sufficient to cause the bursting of the bag will act to arrest the opening of the press. In some cases a partial stoppage of the pressure outlet either at the valve stem or at some other point in the discharge may not be sufficient to prevent a reduction of pressure in the bag below the danger point at the time when the press opens. In such case the device does not arrest the opening movement. This is an added advantage of the device because it does not prevent the opening of the press if the pressure within the bag is below the danger point, and in such cases the tire does not remain in the mold beyond its normal curing period. In this way, many tires are saved which would be ruined by overcuring were the device active at pressures below the danger point.

In the drawings and specification, the best known or preferred embodiment of the invention is shown and described, and the invention is shown as adapted to a specific type of press structure. It will be understood, however, that the invention is limited neither to the particular type of press shown nor to the specific type of control arrangement. Having described the principle of its operation embodied in the form shown herein, the invention may be modified or altered to adapt it to other types of presses and the arrangement of the actuating mechanism may be revised or modified without departing from the basic features and principles of the invention. It will also be understood that the invention may be applied to presses for vulcanizing other articles than pneumatic tires, as long as there is expansion of the article due to the pressure therein, sufficient to move the mold elements in the manner set forth.

In the drawings:

Fig. 3 is a view similar to Fig. 2, but showing the position of the parts on the opening of the press, if the pressure within the air bag is of sufficient intensity to cause rupture of the bag should the opening movement continue. This view shows the way in which the safety device trips the switch to the press operating motor;

Fig. 4 shows an enlarged detail of the switch operating parts when the conditions of Fig. 1 are present;

Figure 5:
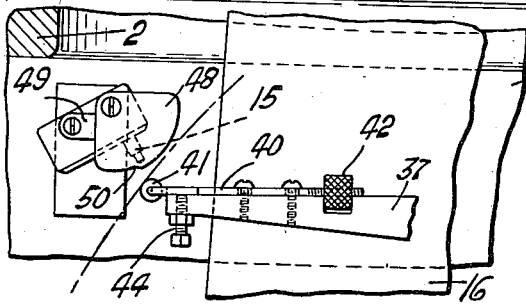

Fig. 5 is an enlarged view of details of the switch operating mechanism showing the clearing of the device when the press operation is normal; and Fig. 6 is a view similar to Fig. 4, but showing by full lines the position of the switch operating lever when the conditions of Fig. 3 are present as the press opens; the dotted lines show the normal position, as in regular operation when the pressure within the bag is completely relieved or reduced below the bag-rupture point.

The present invention is based upon the utilization of the fact that the force of the pressure within the air bag expands the latter and the article in which it is placed, such as a tire, and tends to spread the mold elements and thus to set up certain reactions in the press mechanism which are availed of to arrest the operation of the press if the pressure is still within the bag. This expansive force will tend to stretch the connecting links which hold the mold sections together and will also take up any looseness in the bearings. This difference in the position of the press elements when the pressure is on or relieved is sufficient to actuate certain elements which are used to control the motor or other instrumentality used for operating the press.

In the embodiment shown, the mechanism consists of mounting a switch upon the press in such position that, should sufficient pressure remain in the air bag to make the opening of the press dangerous, the switch will be thrown upon the initial movement of the press and the current to the press operating motor shut off. Should the press be of the hydraulic type, the safety device would operate to close a valve leading to the press operating cylinders. Other adaptations of the principles of the invention as dictated by the particular type of actuating means employed would be in the realm of mechanical skill.

The mechanism which is illustrated and described is also provided with means to insure that the safety device will not function accidentally during the closing movement.

Referring now to the specific form of the invention, the press comprises a base 1 on which is mounted the stationary or fixed heated mold element 2. The upper movable platen is designated at 3 and carries the complementary heated mold section 5. The tire is indicated at T and the expansible curing bag, commonly called the "air bag," is shown at B. The valve stem through which the fluid pressure is introduced and withdrawn from the bag is shown at V, being attached by any of the well known devices to a source of fluid under pressure, the piping and valve mechanism not being shown as they are common to the art and form no part of the present invention. The motor by which the press is operated is indicated at 6 and is intended to drive, through appropriate reduction gearing (not shown), the main drive shaft 8 to which is secured the operating crank 10.

It will be understood that the mechanism is controlled by any of the usual time-controlling devices common in the art by which the cycle of operations is regulated. The workman places a tire in the lower half of the mold, makes the connection at the valve V and then presses a button which sets the control mechanism in operation and this, in turn, closes the press about the tire and turns on the pressure. After the required interval to complete the cure, the time-controlling mechanism shuts off the source of fluid pressure, and after a sufficient interval to permit the pressure to be relieved to the proper point, if there is no stoppage in the line, opens the press.

With such automatic control, it is desirable that a safety device be provided which will insure against the opening of the mold if the bag contains sufficient fluid pressure to cause rupture of the bag.

Figure 1:
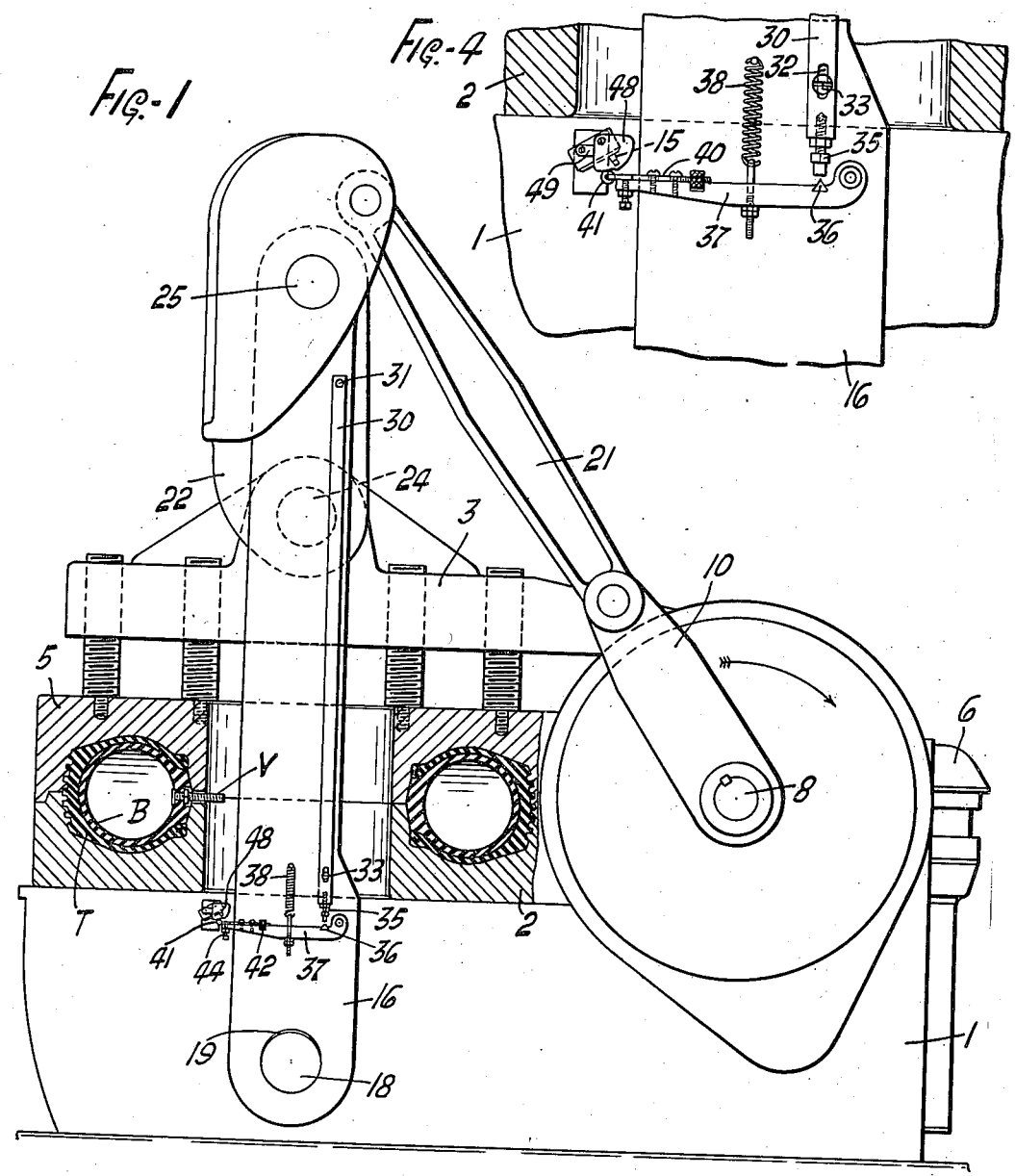
Fig. 1 is an elevation of a press of the type shown in my prior application Serial No. 199,417, filed April 1, 1938, with the new form of safety device applied thereto, the mold being shown in section and the press closed as in the curing operation.

The safety device comprises an electric switch or circuit breaker, indicated at 15, which, in the present showing, is mounted in the base plate 1 adjacent to one of the main operating links 16 of the press. The operating links are usually arranged at either side of the press and are mounted on a stationary shaft 18 in the base of the press. The pivotal connection at the shaft 18 is as close a fit as is practicable, but there is always a certain looseness in the bearing and this has been shown in exaggerated condition in the drawings, being indicated by the numeral 19. When the press is closed and pressure is on in the air bag, the expansive force of the bag acting through the upper platen will tend to move the links upwardly bodily. There will also be a certain amount of longitudinal stretch in the links due to this pressure, and the combination of these factors will give a degree of movement in the link which is quite small but still appreciable and of such extent as to make the principle involved practical. A comparison of the views in Figs. 1 and 3 with that in Fig. 2 will show the relative position of the link 16 and its bearing with pressure on and off, respectively.

Figure 2:
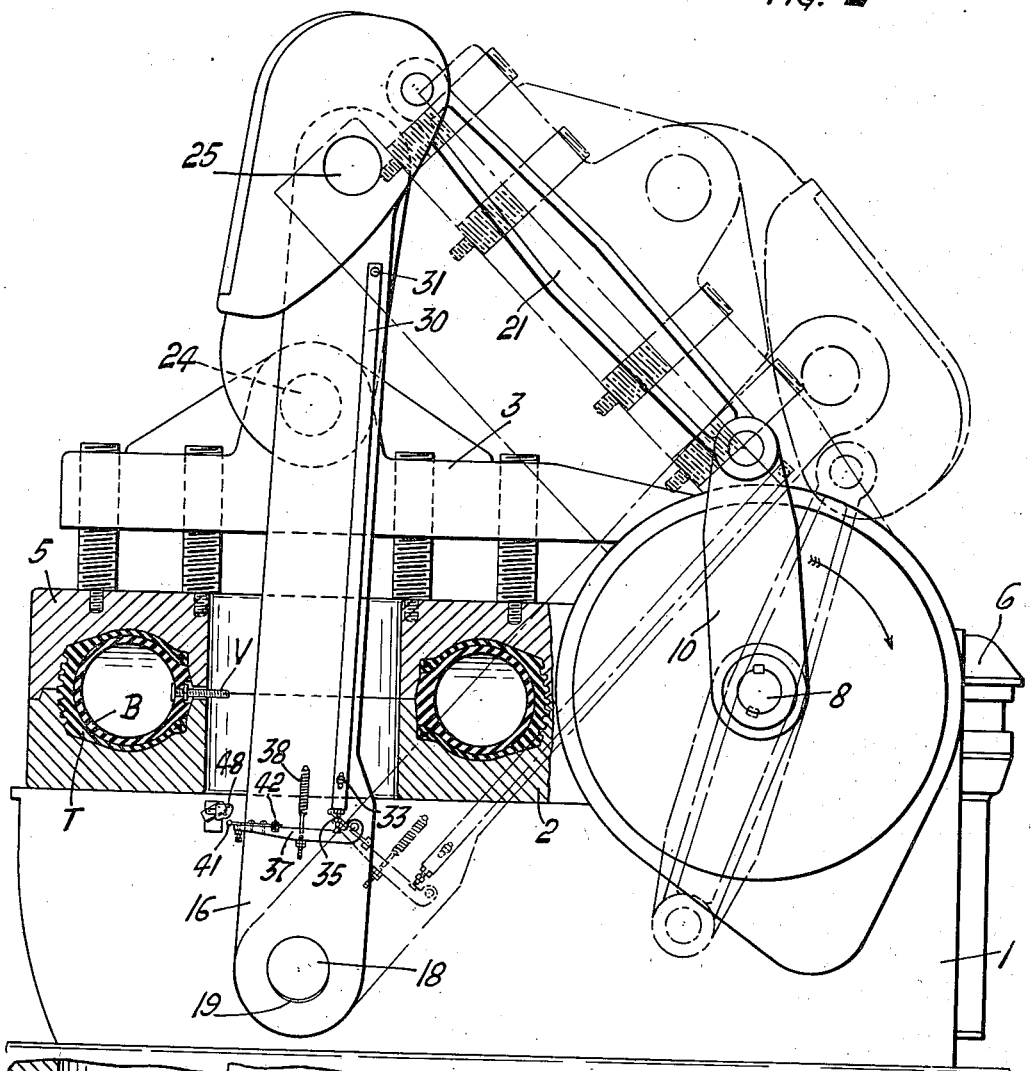
Fig. 2 is a similar view showing the press as it starts its opening movement as in the normal operation, showing the relative position of the linkage in moving the upper half of the mold; the dotted lines show the press in fully open position.

The link 16 is actuated from the crank 10 by a connecting link 21 pivoted at its outer end to an intermediate link 22 which is, in turn, pivoted to the upper platen at 24 and to the link 16 at an intermediate point through the shaft 25. When the press is closed, as in the vulcanizing operation, the link 16 is substantially vertical and the intermediate link 22 in alignment therewith. This final closing operation exerts a heavy pressure upon the mold elements and will stretch the link 16 and raise it into the position shown in Fig. 1. On the normal opening movement when the links pass out of alignment as shown in Figs. 2 and 5, the link 16 relaxes to its original length and also moves downwardly as permitted by the looseness in the bearing to the position shown in Fig. 2 so that the switch 15 will be out of the path of its actuating device. If, however, substantial pressure remains in the bag, the link will not immediately relax and will remain in its uppermost position as shown in Fig. 3, due to the expansive force exerted by the bag in the direction of the link, so that the switch 15 will be in the path of its actuating device. This is also shown by the slight separation of the mold sections apparent in Fig. 3.

In order to employ this reaction of the press members, and particularly the link 16, to accomplish the purposes of the invention, a long bar 30 is mounted on the side of the link 16, being secured at its upper end near the top of the link as at 31 and extending downwardly to a point near the lower end of the link where it is slotted as at 32 and received over a guiding pin 33 in the link. As one end of the bar is fixed to the link while the other end is free thereof, this arrangement permits of a relative movement between the lower end of the link 16 and the bar, for as no tension is exerted upon the bar 30, the tension on the link 16 will cause the lower region of the link to shift appreciably with respect to the end of the bar. This is shown by the relative position of the full and dotted lines in Fig. 6. In the lower end of the bar 30 is mounted the adjustable set screw 35, the head of which bears against a thin-edged blade 36 mounted in the actuating lever or trip 37 which is, in turn, pivoted on the link 16, being held in contact with the set screw by a coil spring 38. The adjustment of the screw 35 affords a means for securing a coarse adjustment at which the device will function. On the outer end of the lever is mounted the adjustable bar 40 which carries the switch operating roller 41. A nut 42, set in a recess in the bar 37, gives a finer adjustment of the roller 41 and a still more accurate adjustment is secured by the set screw 44 bearing against the underside of the bar 40.

It will be seen that as the lever 37 is pivoted to the link 16, elongation of the link will cause the lever to rock upwardly, as shown in full lines in Fig. 6, from the normal position shown in dotted lines in the same figure and also in Fig. 5. At the same time the upward shifting of the link, due to the closing operation and to the presence of pressure within the air bag, will cause the far end of the lever to approach the switch 15 which is located at the proper point on the base plate.

As is shown in Figs. 4 and 6, when the lever 37 is raised, due to the combined stretching of the link and the taking up of the looseness in the lower bearing, the free end of the lever 37 is shifted to a position where the roller 41 will strike the switch 15 when the link 16 is rocked about its pivot in the press opening movement. If, however, the parts are in their normal position with no pressure within the bag, the position of the lever 37 will be lowered so that the roller 41 will clear the switch 15 on the opening movement. This is clearly shown in Fig. 5 where the path of the roller 41 is indicated by the dot and dash line.

As has been explained, the switch 15 is in the main line to the motor 6, and while the press will start its opening movement, the lever will open the switch if pressure remains in the air bag. The amount of pressure in the air bag which is sufficient to cause bursting of the bag will also be sufficient to keep the free end of the lever raised in position to strike the operating switch.

If a very heavy tire is being treated, or for some other reason, the parts may not assume the position shown in Fig. 2 while the press is being closed and the roller 41 may accidentally strike the switch at the end of the closing movement. To prevent such contingency, the switch is provided with a pivoted shield 48 mounted on the side of the switch and resting by gravity against a stop 49 in position to cover the switch. A notch 50 in the underside of the shield or guard is located in the path of the roller when the conditions of Fig. 3 are present, and the continued movement of the roller raises the guard and the roller contacts the switch. When the press is fully opened, the guard will drop back in place, but is so located that if the lever 37 is not in lowered position on closing, the roller 41 will strike the side of the guard and the roller will ride over the face of the guard, clearing the switch.

It will be seen from the preceding description that the device is a true safety device, directly responsive to and actuated by the force exerted by the internal fluid pressure in the bag. While in the form shown, the press will start its opening movement, the exact point at which such movement is arrested is controllable by the position and adjustment of the parts. It is possible, therefore, to secure a wide range of action within the scope of the invention.

What is claimed is:

1. In a press for the vulcanization of expansible articles while under internal fluid pressure comprising complementary mold sections, means to open the press at the completion of vulcanization, a device operable after the beginning of the opening movement of the press to arrest the opening movement thereof, and means including at least one of said mold sections and operable directly by the expansive force of the fluid under pressure within the article for actuating said device.

2. In a vulcanizing press for pneumatic tires including complementary mold sections, a conduit to supply fluid under pressure to a bag on the interior of the tire, means to open and close the press, mechanism operable after the beginning of the opening movement of the press to prevent the opening thereof sufficiently to permit the bursting of the bag, and means including at least one of said mold sections and operable directly by the expansive force of the fluid under pressure within said bag for actuating said mechanism.

3. In a press including complementary mold sections for vulcanizing a tire upon a pressure bag, means to supply fluid under pressure to the bag, operating means to open and close the press, means operable after the beginning of the opening movement of the press to arrest the opening movement thereof comprising a control device for the operating means, and mechanism including at least one of said mold sections and operable directly by the expansive force of the fluid under pressure within said bag for actuating said control device.

4. In a press including complementary mold sections for vulcanizing a tire upon a pressure bag, means for supplying fluid under pressure to the bag, operating means to open and close the press, means operable after the beginning of the opening movement of the press to arrest the opening movement thereof comprising a control device for the operating means, and shiftable mechanism including at least one of said mold sections responsive directly to the expansive force of the fluid under pressure within said bag and shiftable by said expansive force into position to actuate said control device.

5. In a press comprising complementary mold sections for vulcanizing a tire upon a pressure bag, means for supplying pressure to the bag, operating means to open and close the press including a link to move the mold sections relative to each other, a safety switch operable to control the operating means after the beginning of the opening movement of the press and a device on said link and movable by reaction of the pressure within the bag upon the link into position to operate said safety switch.

6. In a press including complementary mold sections for vulcanizing expansible articles under internal fluid pressure, means for supplying fluid under pressure to the article during vulcanization, means to open the press, a control for said opening means, and mechanism including at least one of said mold sections and operable directly by the expansive force of the fluid under pressure within the article for actuating said control.

7. In a press including complementary mold sections for vulcanizing expansible articles under internal fluid pressure, means for supplying fluid under pressure to the interior of the article during vulcanization, means to open the press, a control for said opening means, a trip device for said control, and mechanism including at least one of said mold sections and operable directly by the expansive force of the fluid under pressure within the article to move said trip device into position to actuate said control.

8. In a press for vulcanizing a tire upon a pressure bag, means for supplying pressure to the bag, operating means to open and close the press, a switch controlling said operating means, a device movable by the pressure within the bag into position to actuate the switch during the opening of the press, and means to prevent the actuation of the switch during the closing of the press.

9. In a press for vulcanizing tires upon bags, separable mold sections, a motor to move one of said sections with respect to the other, a circuit breaker in the motor line, a trip for said circuit breaker movable on the opening of the press, and means actuated by pressure within the bag to place the trip in position to strike the circuit breaker upon separation of the mold sections.

10. In a press for vulcanizing a tire upon a bag, means to supply pressure to the bag, separable mold sections, a link to move one of said mold sections with respect to the other, a prime mover to actuate the link, a control for the prime mover, and a device on the link movable by reaction of the pressure within the bag upon the link into position to operate the control.

11. In a press for vulcanizing a tire upon a bag, means to supply pressure to the bag, separable mold sections, a link to move one of said mold sections with respect to the other, a motor to actuate the link, a circuit breaker for the motor, and a lever carried by said link and movable into and out of position to actuate the circuit breaker by pressure variations within the bag.

12. In a press for vulcanizing expansible articles while under internal pressure comprising separable mold sections, means to open and close the mold sections including a link to move one of said mold sections with respect to the other, means to supply pressure to the interior of the article, and a device directly responsive to movement of at least one of said mold sections for controlling the operation of the press opening means, said device including a bar arranged longitudinally of said link and secured at one end to said link.

13. In a press for vulcanizing expansible articles while under internal pressure comprising separable mold sections, operating means to open and close the mold sections including a prime mover and a link to move the mold sections relative to each other, and means to render the prime mover inoperative comprising a device directly responsive to movement of at least one of said mold sections, said device including a bar arranged longitudinally of said link and secured at one end to said link, the other end of said bar being mounted for relative movement with respect to said link.

14. In a press for vulcanizing expansible articles while under internal fluid pressure comprising separable mold sections, operating means to open and close the mold sections including a prime mover and a link to move one of said mold sections with respect to the other, and means to render the prime mover inoperative comprising a device actuated by the movement of at least one of said mold sections which movement is caused directly by the expansive force of the fluid under pressure within the article, said device including a bar arranged longitudinally of said link and secured at one end to said link, the other end of said bar being mounted for relative movement with respect to said link, and a lever carried by said link and engaged by the last mentioned end of said bar.

15. In a press for vulcanizing expansible articles while under internal fluid pressure comprising separable mold sections, operating means to open and close the mold sections including a prime mover and a link to move one of said mold sections relative to the other, means to render the prime mover inoperative, and a device on the link movable by reaction of the pressure within the bag upon the link into position to operate said last named means.

16. In a press for vulcanizing expansible articles while under internal pressure comprising separable mold sections, a link to move one of said mold sections with respect to the other, a prime mover to actuate the link, a switch for the prime mover, a bar extending longitudinally of said link and fixed at one end to said link, and a lever to actuate the switch carried by said link adjacent the other end of said bar.

LESLIE E. SODERQUIST.